US012761408B2

(12) United States Patent
Takata

(10) Patent No.: US 12,761,408 B2
(45) Date of Patent: Oct. 13, 2026

(54) POLYGON MIRROR, OPTICAL DEFLECTOR, OPTICAL SCANNING DEVICE, AND IMAGE FORMING APPARATUS

(71) Applicant: CANON KABUSHIKI KAISHA, Tokyo (JP)

(72) Inventor: Atsushi Takata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 18/174,141

(22) Filed: Feb. 24, 2023

(65) Prior Publication Data

US 2023/0280509 A1 Sep. 7, 2023

(30) Foreign Application Priority Data

Mar. 3, 2022 (JP) ................................ 2022-032615

(51) Int. Cl.
*G02B 5/08* (2006.01)
*G02B 26/12* (2006.01)
*G03G 15/043* (2006.01)

(52) U.S. Cl.
CPC ......... *G02B 5/0816* (2013.01); *G02B 26/121* (2013.01); *G03G 15/0435* (2013.01)

(58) Field of Classification Search
CPC . G02B 5/0816; G02B 26/121; G03G 15/0435
USPC .......................................................... 359/871
See application file for complete search history.

(56) References Cited

U.S. PATENT DOCUMENTS 5,561,545 A * 10/1996 Kaino ...................... G02B 5/09 359/850
2014/0001013 A1 1/2014 Takifuji
2015/0226958 A1* 8/2015 Hayakawa ............ G02B 26/12 359/850
2017/0097450 A1 4/2017 Hoshino et al.
2019/0129326 A1* 5/2019 Takamura .............. G02B 26/12
2019/0322022 A1* 10/2019 Ohta ................ G03G 15/04036
(Continued)

FOREIGN PATENT DOCUMENTS

CN 104834086 A 8/2015
CN 104834087 A 8/2015
(Continued)

*Primary Examiner* — Sharrief I Broome
(74) *Attorney, Agent, or Firm* — Canon U.S.A., Inc., IP Division

(57) ABSTRACT

Provided is a polygon mirror that includes a resin member including a first surface, a second surface opposite to the first surface, a through-hole extending from the first surface to the second surface, an inner side surface, which intersects with the first and second surfaces, surrounding the through-hole, outer side surfaces, each of which intersects with the first and second surfaces on an opposite side of the inner side surface, and a die piece division line surrounding the through-hole and disposed on the second surface. The second surface intersects with the individual outer side surfaces at intersection lines. The intersection lines include first and second intersection lines intersecting with the first intersection line at an intersection, which is a first corner portion. The die piece division line is provided closer to the through-hole than a first midpoint between the inner side surface and the first corner portion.

20 Claims, 14 Drawing Sheets

(56) References Cited

U.S. PATENT DOCUMENTS

| | | | | |
|---|---|---|---|---|
| 2022/0373925 | A1 * | 11/2022 | Kobayashi ....... | G03G 15/04036 |
| 2022/0382044 | A1 * | 12/2022 | Takata .................. | G02B 26/12 |

FOREIGN PATENT DOCUMENTS

| | | | |
|---|---|---|---|
| CN | 110398835 | A | 11/2019 |
| EP | 0294218 | B1 | 7/1988 |
| EP | 0558074 | A1 | 9/1993 |
| JP | H06110002 | A | 4/1994 |
| JP | H07325260 | A | 12/1995 |
| JP | H0820075 | A | 1/1996 |
| JP | H08118496 | A | 5/1996 |
| JP | H09243951 | A | 9/1997 |
| JP | 2015152653 | A | 8/2015 |
| JP | 2019191335 | A | 10/2019 |
| WO | 2021240977 | A1 | 12/2021 |

* cited by examiner

POLYGON MIRROR, OPTICAL DEFLECTOR, OPTICAL SCANNING DEVICE, AND IMAGE FORMING APPARATUS

BACKGROUND

Field of the Disclosure

The present disclosure relates to a polygon mirror.

Description of the Related Art

An optical scanning device used in an image forming apparatus such as a laser printer modulates laser light emitted from a light source based on an image signal. The optical scanning device includes an optical deflector provided with a rotary polygon mirror, which deflects the optically modulated light for a scanning operation. The laser light deflected by the optical deflector for the scanning operation forms an image on a photosensitive drum, which is an example of an image carrier, through a scanning lens such as an F-Theta (fθ) lens. As a result, an electrostatic latent image is formed on the surface of the photosensitive drum.

While in most cases a metal polygon mirror is used in this kind of device, a resin polygon mirror formed by injection molding is beginning to gain popularity. This is because a resin polygon mirror results in a lower cost and has a higher degree of flexibility in shape than a metal polygon mirror. For example, Japanese Patent Application Laid-Open No. 2019-191335 discusses a resin polygon mirror formed by injection molding and having a through-hole.

When a polygon mirror having a through-hole is formed by injection molding, the portion of a mold that forms a through-hole is divided into die pieces as separate members to facilitate adjustment of the size of the through-hole. However, this may result in a reduced rigidity of these die pieces of members, causing these members to be displaced by the molding pressure during injection molding. This may deteriorate the shape accuracy of the molded product.

SUMMARY

The present disclosure is directed to improving the shape accuracy of a molded product.

According to an aspect of the present disclosure, a polygon mirror comprises a resin member including a first surface, a second surface opposite to the first surface, a through-hole extending from the first surface to the second surface, an inner side surface, which intersects with the first surface and the second surface, surrounding the through-hole, a plurality of outer side surfaces, each of which intersects with the first surface and the second surface on an opposite side of the inner side surface, and a die piece division line surrounding the through-hole and disposed on the second surface. The second surface intersects with the individual outer side surfaces at intersection lines. The intersection lines include a first intersection line and a second intersection line that intersects with the first intersection line at an intersection, which is a first corner portion. The die piece division line is provided closer to the through-hole than a first midpoint between the inner side surface and the first corner portion.

Further features of the present disclosure will become apparent from the following description of embodiments with reference to the attached drawings.

DESCRIPTION OF THE EMBODIMENTS

Figure 1:
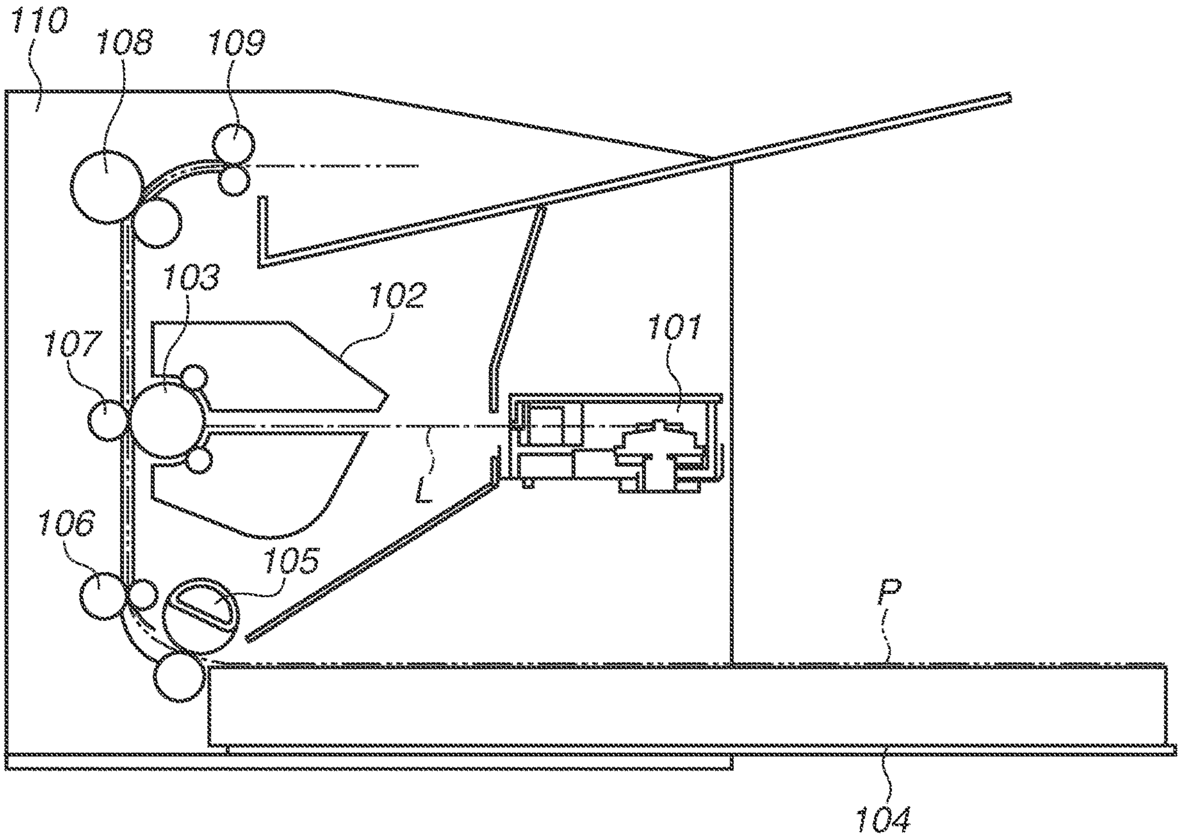
FIG. 1 is a schematic sectional view of an image forming apparatus.

Hereinafter, embodiments of the present disclosure will be described with reference to the accompanying drawings. However, the individual embodiments described below are each one embodiment of the present disclosure, and the present disclosure is not limited thereto. In addition, like components will be described with reference to a plurality of drawings, and description of the components denoted by like reference characters will be omitted as appropriate. Separate matters having the same name can be distinguished by denoting the matters by ordinal numbers, such as the first matter and the second matter.

A first embodiment will be described. FIG. 1 is a schematic sectional view illustrating an image forming apparatus 100 according to the present embodiment. While the image forming apparatus 100 in FIG. 1 is an electrophotographic printer, the image forming apparatus 100 may alternatively be a copier, a facsimile, a multifunction printer, or other devices.

The image forming apparatus 100 includes an image forming unit 110 that forms images on sheets P, which are recording media. The image forming unit 110 includes an optical scanning device 101, a process cartridge 102, a transfer roller 107, which is an example of a transfer unit, and a fuser 108. The process cartridge 102 includes a photosensitive drum 103, which is an example of an image carrier.

The optical scanning device 101 emits laser light L based on acquired image information onto the photosensitive drum 103 of the process cartridge 102 to scan the surface of the photosensitive drum 103. This forms a latent image on the photosensitive drum 103, and this latent image is rendered visible as a toner image with toner as a developer by the process cartridge 102.

The sheets P placed on a sheet stacking plate 104 are separated and fed one by one by sheet feed rollers 105. An individual sheet P is conveyed by conveyance rollers 106 to the nip portion between the photosensitive drum 103 and the transfer roller 107. The toner image formed on the photosensitive drum 103 is transferred by the transfer roller 107 onto the sheet P conveyed to the nip portion.

The sheet P on which the toner image to be fixed has been transferred is conveyed to the fuser 108 downstream of the photosensitive drum 103. The fuser 108 includes a heater therein and fixes the toner image to the sheet P as an image by heat and pressure applied to the sheet P. Subsequently, the sheet P is discharged to the outside by discharge rollers 109.

Figure 2A:
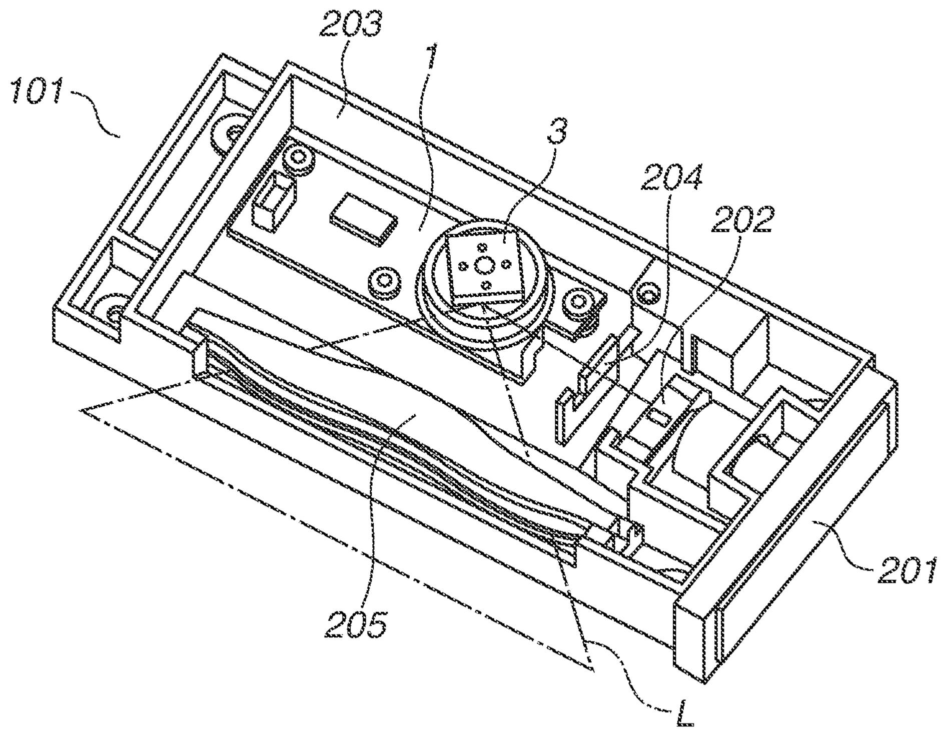
FIG. 2A is a schematic perspective view of an optical scanning device.

FIG. 2A is a schematic perspective view of the optical scanning device 101 according to the first embodiment. The optical scanning device 101 includes a housing 203, a light source 201 supported by the housing 203, a cylindrical lens 202, an F-Theta (fθ) lens 205, and a scanner motor 1, which is an example of an optical deflector. An optical aperture 204 is formed in the housing 203. The laser light L emitted from the light source 201 is collected by the cylindrical lens 202 and is limited by the optical aperture 204 to a predetermined beam diameter.

The laser light L that has passed through the optical aperture 204 is deflected by the scanner motor 1 and passes through the fθ lens 205. The laser light Lis subsequently focused on the photosensitive drum 103 in FIG. 1 and forms an electrostatic latent image.

The light source 201, the cylindrical lens 202, the scanner motor 1, and other components are contained in the housing 203. The opening portion of the housing 203 is covered by a resin or metal optical cover (not illustrated).

Figure 2B:
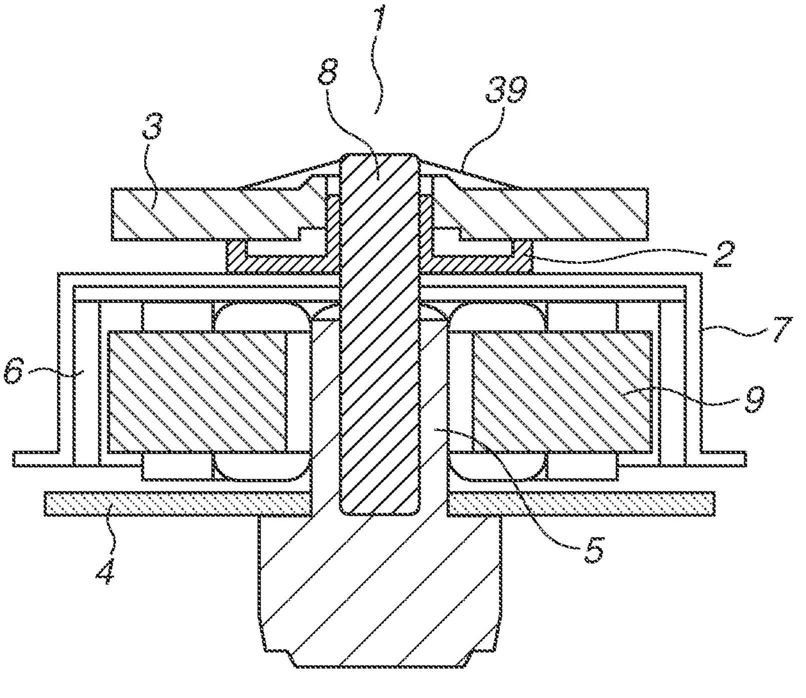
FIG. 2B is a sectional view of a polygon mirror.

FIG. 2B is a sectional view of the scanner motor 1 according to the first embodiment. FIG. 2B schematically illustrates a cross section of the scanner motor 1 taken along a plane including the rotation center of the scanner motor 1. The scanner motor 1 includes a base plate 4 formed of a metal, a bearing sleeve 5 fixed to the base plate 4, a rotor 7 including a rotor magnet 6, and a rotation shaft 8 rotatably supported by the bearing sleeve 5 and integrally formed with the rotor 7. The scanner motor 1 also includes a base 2 integrally formed with the rotor 7, a stator coil 9 fixed to the base plate 4, a polygon mirror 3 fixed to the rotation shaft 8 via the base 2, and a spring 39 that presses the polygon mirror 3 against the base 2 with appropriate force to prevent the base 2 from spinning free. By rotating, the polygon mirror 3 deflects the laser light L illustrated in FIG. 2A. The polygon mirror 3 includes a resin member 30, which is a base member made of resin, and a reflective film formed on each side surface of the resin member 30.

Figure 3A:
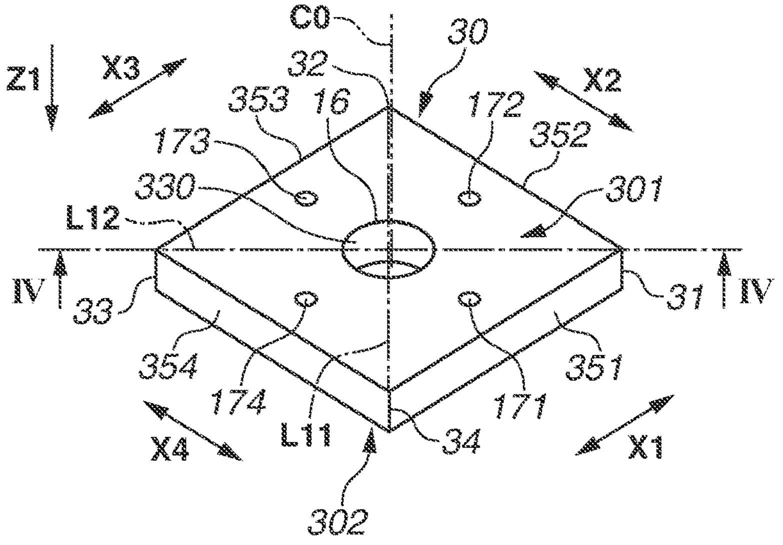
FIGS. 3A to 3C are perspective views and a sectional view of the polygon mirror according to the first embodiment.
Figure 3B:
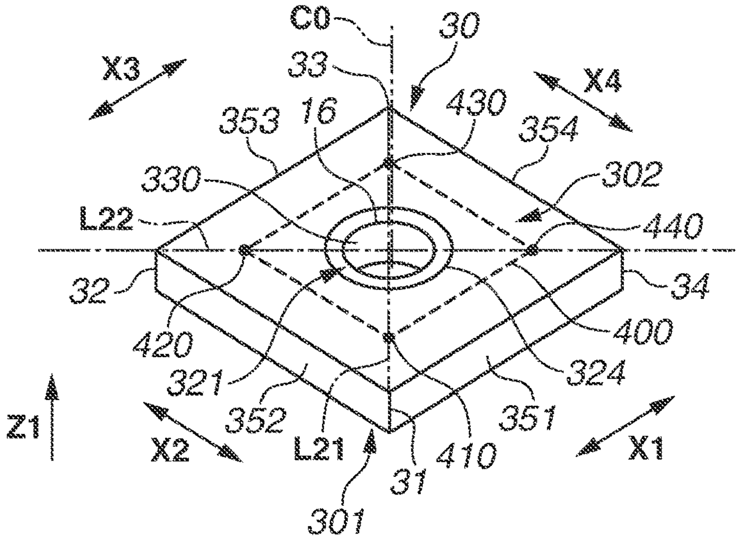
Figure 3C:
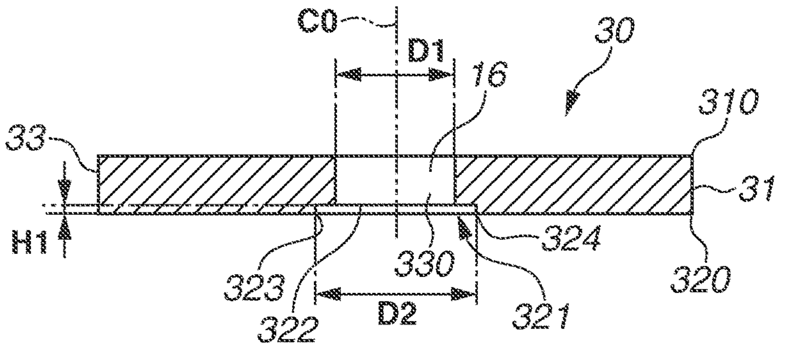

The polygon mirror 3 according to the present embodiment will now be described. FIGS. 3A and 3B are perspective views of the resin member 30 of the polygon mirror 3 according to the present embodiment, and FIG. 3C is a sectional view of the resin member 30 taken along a line IV-IV in FIG. 3A. FIG. 3A is a perspective view of the top surface of the resin member 30 of the polygon mirror 3. FIG. 3B is a perspective view of the bottom surface of the resin member 30 of the polygon mirror 3.

The resin member 30 is a resin member in a polygonal prism shape, which is a quadrangular prism shape in the present embodiment. It is suitable that a thermoplastic resin is used as the resin material of the resin member 30. Among the thermoplastic resins, it is suitable that a cycloolefin polymer, a cycloolefin copolymer, polycarbonate, or acrylic is used.

The resin member 30 has a top surface 301 as a first surface and a bottom surface 302 as a second surface, which is opposed to the first surface. The resin member 30 also has an inner side surface 330, which intersects with the first surface and the second surface, and a plurality of outer side surfaces, which are four outer side surfaces 351, 352, 353, and 354 in the present embodiment, each of which intersects with the first surface and the second surface on the opposite side of the inner side surface 330. The resin member 30 has a corner portion 31 at which the outer side surface 351 and the outer side surface 352 intersect, a corner portion 32 at which the outer side surface 352 and the outer side surface 353 intersect, a corner portion 33 at which the outer side surface 353 and the outer side surface 354 intersect, and a corner portion 34 at which the outer side surface 354 and the outer side surface 351 intersect. For example, when a certain corner portion is referred to as a first corner portion, a corner portion adjacent to the first corner portion will be referred to as a second corner portion.

A through-hole 16 is formed in a position including a virtual line C0 that passes at the intersection of two diagonal lines L11 and L12 on the top surface 301 and the intersection of two diagonal lines L21 and L22 on the bottom surface 302. The inner side surface 330 is formed surrounding the through-hole 16. That is, the virtual line C0 is the rotation center line of the resin member 30 and is the central axis of the through-hole 16. The rotation shaft 8 illustrated in FIG. 2B is inserted into the through-hole 16. While the through-hole 16 according to the present embodiment has a circular shape, in at least one embodiment, the through-hole 16 may have a quadrangular shape such as a rectangular shape.

In FIG. 3C, an intersection line 320 between the bottom surface 302 and one of the outer side surfaces 351 to 354 is used as the reference of the height in the direction from an intersection line 310 between the top surface 301 and the corresponding outer side surface of the outer side surfaces to the intersection line 320. The resin member 30 has a recessed portion 321 recessed toward the top surface 301 with respect to the intersection lines 320, inside the bottom surface 302, which is at a portion where the inner side surface 330 and the bottom surface 302 intersect. Among the intersection lines 320, the intersection line connecting the corner portion 31 and the corner portion 32 may be referred to as a first intersection line, and the intersection line connecting the corner portion 31 and the corner portion 34 may be referred to as a second intersection line. In this case, the corner portion 31 is a first corner portion. The recessed portion 321 has a recessed bottom surface 322 that intersects with the inner side surface 330 and a recessed side surface 323 that intersects with the recessed bottom surface 322 and the bottom surface 302. The recessed side surface 323 has a circular cross section when seen in the direction in which the virtual line C0 extends. The recessed side surface 323 has the same axis as that of the inner side surface 330. That is, the virtual line C0 is also the central axis of the recessed side surface 323. The area of the recessed portion 321 is synonymous with the area of the recessed bottom surface 322 and is also synonymous with the area of a region between the through-hole 16 and a die piece division line 324.

The recessed portion 321 recessed with respect to the intersection lines 320 allows the base 2 and the recessed portion 321 to be reliably prevented from coming into contact with each other, making it possible to assemble the polygon mirror 3 to the base 2 with high accuracy.

The recessed side surface 323 is a surface formed by dividing the mold, and the intersection line between the bottom surface 302 and the recessed side surface 323 is the die piece division line 324 of the mold. Thus, in the present embodiment, the virtual line C0 is also the central axis of the die piece division line 324.

In the present embodiment, the die piece division line 324 is formed surrounding the through-hole 16 and may be provided closer to the outer side surfaces 351 to 354 than the through-hole 16 or may be formed at the same position as the inner side surface 330 in the direction in which the virtual line C0 extends. When the die piece division line 324 is provided closer to the outer side surfaces 351 to 354 than to the through-hole 16, it is suitable that the distance between the die piece division line 324 and the through-hole 16 is 0.2 mm or more. It is more suitable that the distance is 0.5 mm or more.

The die piece division line 324 lies closer to the through-hole 16 than midpoints 410, 420, 430, and 440 between the inner side surface 330 and the corner portions 31, 32, 33, and 34, respectively. Further, it is more suitable that the die piece division line 324 lies closer to the through-hole 16 than a midpoint line 400 that connects the midpoints 410 to 440 between the inner side surface 330 and the corner portions 31 to 34, respectively. With these configurations, the size of the die piece division line 324 can be designed to be smaller. The present inventor has found that forming the die piece division line 324 smaller reduces the area of the region between the die piece division line 324 and the through-hole 16, and consequently reduces the molding pressure on the recessed bottom surface 322 at the time of injection molding. This allows the area of the portion to which the molding pressure is applied in the direction of the virtual line C0 on the mold member for forming the through-hole 16 in molding the resin member 30 to be reduced, reducing the deformation of the mold member. A reduced deformation prevents the shape accuracy of the molded product from being deteriorated, providing a polygon mirror with high optical characteristics. Each of the midpoints 410 to 440 between the inner side surface 330 and the corresponding one of the corner portions 31 to 34, respectively, herein is a midpoint between the corresponding one of the corner portions 31 to 34 and a portion of the inner side surface 330, the portion being the closest to the corresponding one of the corner portions 31 to 34. When a midpoint between a certain corner portion and the inner side surface 330 is referred to as a first midpoint, a midpoint lying between the inner side surface 330 and a corner portion sharing one of the outer side surfaces with the certain corner portion will be referred to as a fourth midpoint.

The area of the region sandwiched between the die piece division line 324 and the through-hole 16, which is the area of the recessed bottom surface 322, is smaller than the area of the through-hole 16. That is, the above advantageous effect can also be achieved by designing a diameter D2 of the region surrounded by the die piece division line 324 to be smaller than twice a diameter D1 of the through-hole 16. The area of the through-hole 16 is the area of the through-hole 16 in a plane including the bottom surface 302. It is suitable that the area of the recessed bottom surface 322 is smaller than ⅔ of the area surrounded by the die piece division line 324. In at least one embodiment, it is more suitable that the area of the recessed bottom surface 322 is smaller than ½ of the area surrounded by the die piece division line 324. It is suitable that the through-hole 16 and the die piece division line 324 have a similar shape as in the present embodiment. This facilitates designing a smaller area of the recessed bottom surface 322.

In the present embodiment, for example, the midpoint line 400 forms a square with a side of 7.0 mm, the through-hole 16 has a diameter (φ) D1 of 4.0 mm, and the region surrounded by the die piece division line 324 has a diameter (φ) D2 of 5.6 mm. As a result, the area of the through-hole 16 is 12.6 $mm^2$, and the area of the region sandwiched between the die piece division line 324 and the through-hole 16 is 12.1 $mm^2$. With such values, the polygon mirror 3 with good shape accuracy can be obtained.

In the direction from the inner side surface 330 to the outer side surfaces 351 to 354, it is suitable that the die piece division line 324 is provided at a position of 3.8 mm or less from the inner side surface 330. In at least one embodiment, it is more suitable that the die piece division line 324 is provided at a position of 3.0 mm or less from the inner side surface 330. In addition, it is suitable that the die piece division line 324 is provided at a position of 0.2 mm or more from the inner side surface 330 in the direction of the outer side surfaces 351 to 354.

The recessed portion 321 may have a depth Hl of 0.01 mm or more and less than or equal to 0.5 mm so as not to protrude, mainly in consideration of the processing accuracy of the mold.

Figure 4:
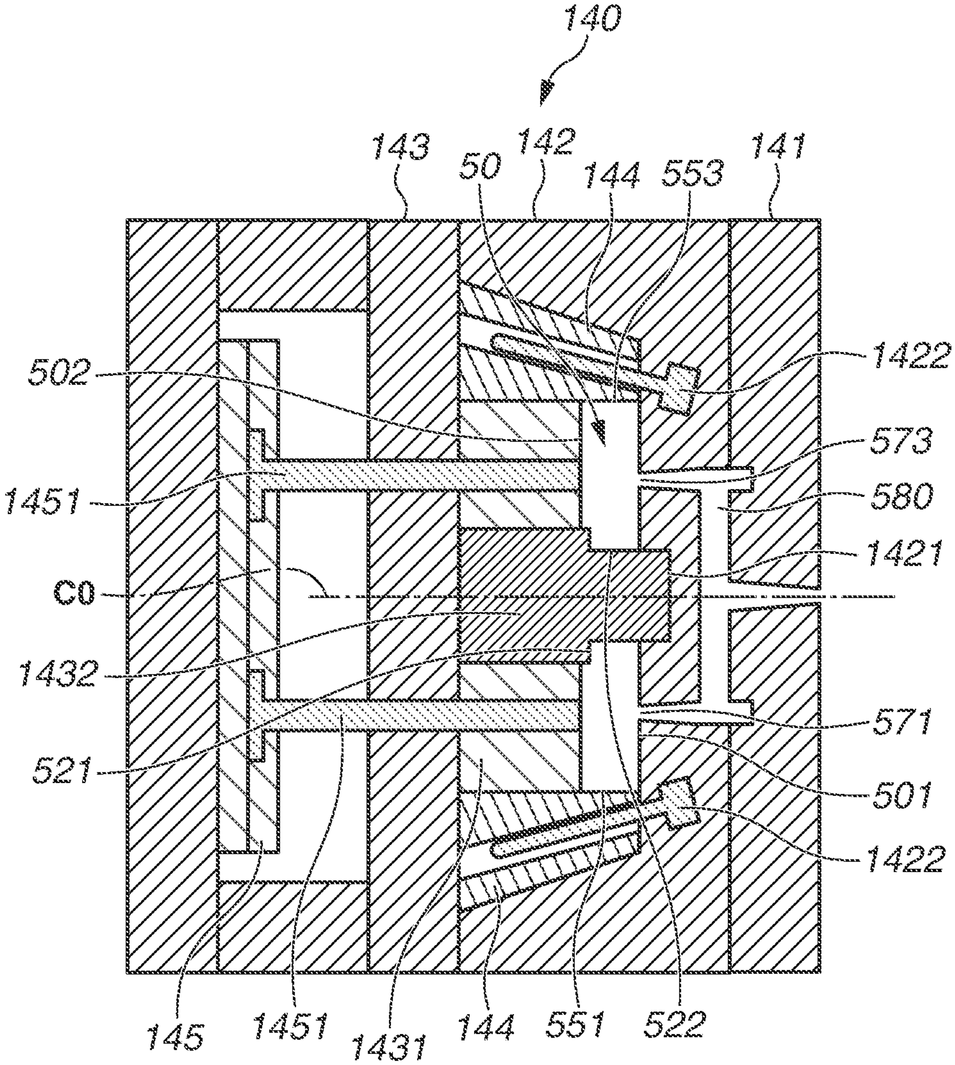
FIG. 4 is a schematic sectional view of a mold according to the first embodiment.
Figure 5A:
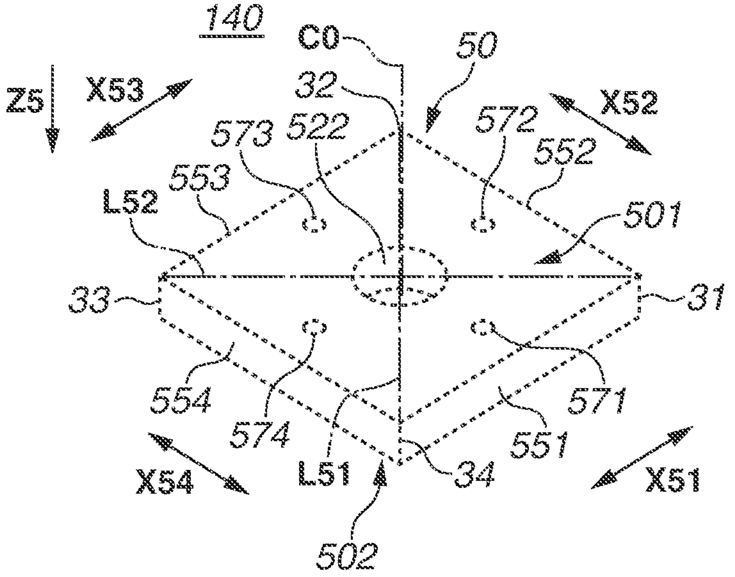
FIGS. 5A and 5B each are a perspective view of a cavity of the mold according to the first embodiment.

Next, the mold used in producing the resin member 30 will be described with reference to FIG. 4. FIG. 4 is a schematic sectional view of a mold 140 according to the present embodiment. FIGS. 5A and 5 illustrate the mold 140 in a closed state. The mold 140 has a cavity 50 for forming the resin member 30. The cavity 50 is defined in a state where the mold 140 is closed.

Figure 5B:
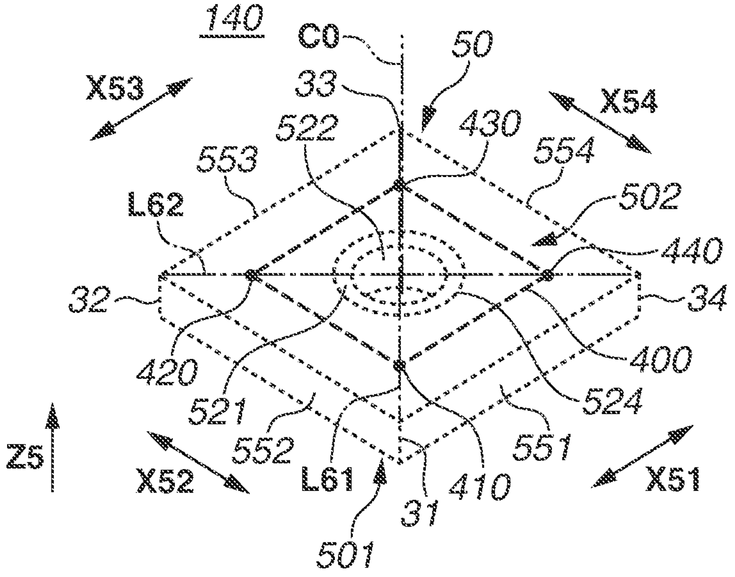

FIGS. 5A and 5B are perspective views of the cavity 50 of the mold according to the first embodiment. FIG. 5A is a perspective view of the top surface of the cavity 50, and FIG. 5B is a perspective view of the bottom surface of the cavity 50.

The cavity 50 is a space in a prism shape, and in the present embodiment, the cavity 50 is a space in a quadrangular prism shape. The mold 140 includes a top-surface forming surface 501 from which the top surface 301 of the resin member 30 is transferred and a bottom-surface forming surface 502 from which the bottom surface 302 of the resin member 30 is transferred. In addition, In the present embodiment, the mold 140 has a plurality of side-surface forming surfaces 551, 552, 553, and 554 from which the outer side surfaces 351, 352, 353, and 354 of the resin member 30 are transferred, respectively. The cavity 50 is defined by these surfaces 501, 502, and 551 to 554.

The mold 140 has a runner stripper plate 141, a stationary-side mold plate 142, and a movable-side mold plate 143. A runner 580 is defined by the runner stripper plate 141 and the stationary-side mold plate 142.

The stationary-side mold plate 142 includes the top-surface forming surface 501, a plurality of gates 571, 572, 573, and 574 for injecting molten resin into the cavity 50, a mold hole 1421, and angular pins 1422. The mold hole 1421 is formed with the same axis as that of the through-hole 16. That is, the center line of the mold hole 1421 is the virtual line C0. In the present embodiment, it is suitable that the number of gates is preferably four, which is equal to the number of side-surface forming surfaces 551 to 554. This enhances the symmetry of the pressure distribution of the resin member 30 in an injection step, which will be described below, improving the shape accuracy of the outer side surfaces 351 to 354 serving as light reflecting surfaces.

It is suitable that the phases of the gates 571 to 574 coincide with the phases of the side-surface forming surfaces 551 to 554 around the virtual line C0, which is the central axis line of the mold hole 1421. This further enhances the symmetry of the pressure distribution of the resin member 30 in the injection step, further improving the shape accuracy of the outer side surfaces 351 to 354 serving as light reflecting surfaces. In addition, welds generated among the gates 571 to 574 can be shifted to the end portions of the outer side surfaces 351 to 354, which are areas outside the scanning range of the laser light L illustrated in FIG. 2A.

The movable-side mold plate 143 includes a movable-side core 1431, a through-hole forming piece 1432, a slide core 144, and an ejector plate 145. The movable-side core 1431 includes the bottom-surface forming surface 502. The through-hole forming piece 1432 includes a recessed-bottom-surface forming surface 521 and a through-hole forming surface 522. That is, the center line of the through-hole forming surface 522 is the virtual line C0. The slide core 144 has the side-surface forming surfaces 551 to 554 and slides in a direction orthogonal to the virtual line C0 while being guided by the angular pins 1422 when the movable-side mold plate 143 are opened or closed.

With the recessed-bottom-surface forming surface 521 provided, the adjustment of the dimensions of the through-hole 16 involves modifying the through-hole forming surface 522 alone of the through-hole forming piece 1423. This eliminates the need for modifying the movable-side core 1431 with the adjustment of the dimensions of the through-hole 16, reducing the molding cost of the polygon mirror 3. A method for adjusting the dimensions of the through-hole 16, for example, is of forming the through-hole forming piece 1432 large, after checking the dimensions, and trimming the through-hole forming surface 522 to desired dimensions. This method reduces the cost. Here, forming the through-hole forming piece 1432 large, for example, means forming the through-hole forming surface 522 wider by approximately 0.01 mm to 0.05 mm toward the side-surface forming surfaces 551 to 554.

It is suitable that the ejector plate 145 has four ejector pins 1451, the number of which is equal to the number of side-surface forming surfaces 551 to 554. This allows the force in sticking out the ejector pins 1451 in the step of removing the resin member 30 from the mold 140 to be uniformly transmitted to the resin member 30. This reduces the deformation of the resin member 30 created while the resin member 30 is removed from the mold 140.

The top-surface forming surface 501, which forms in a quadrangular shape, has two diagonal lines L51 and L52. Likewise, the bottom-surface forming surface 502, which forms in a quadrangular shape, has two diagonal lines L61 and L62.

The recessed-bottom-surface forming surface 521 protruding with respect to the bottom-surface forming surface 502 is formed inside the bottom-surface forming surface 502. This is because the through-hole forming piece 1432 is disposed slightly protruding with respect to the movable-side core 1431, preventing interference when the polygon mirror 3 is assembled to the base 2. As a result, a side surface near the recessed-bottom-surface forming surface 521 of the through-hole forming piece 1432 is transferred, forming the recessed side surface 323.

The intersection line between the side surface near the recessed-bottom-surface forming surface 521 of the through-hole forming piece 1432 and the bottom-surface forming surface 502 of the movable-side core 1431 is a die piece division position 524 of the mold 140 and corresponds to the die piece division line 324.

Similarly to the resin member 30, the die piece division position 524 lies closer to the through-hole 16 than the midpoint line 400 connecting the midpoints 410 to 440, which lies between the through-hole forming surface 522 and the side-surface forming surfaces 551 to 554.

The area of the recessed-bottom-surface forming surface 521 is smaller than the area of the through-hole forming surface 522. This reduces the area of the portion to which the molding pressure is applied in the direction of the virtual line C0 of the through-hole forming piece 1432, which is the area of the recessed-bottom-surface forming surface 521, and deformation of the through-hole forming piece 1432. The reduction of the deformation prevents the shape accuracy of the molded product from being deteriorated, providing the polygon mirror with high optical characteristics.

Figure 6A:
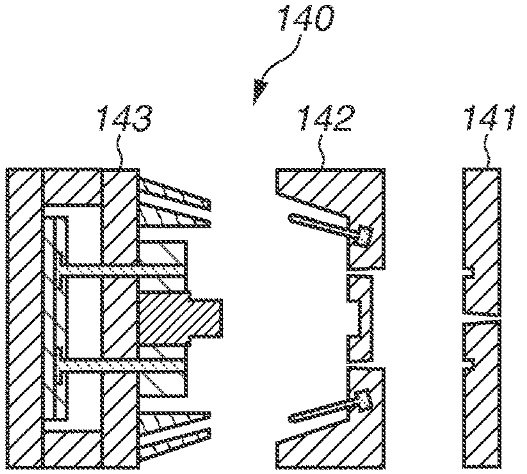
FIGS. 6A to 6C illustrate steps of a resin member manufacturing method.
Figure 6B:
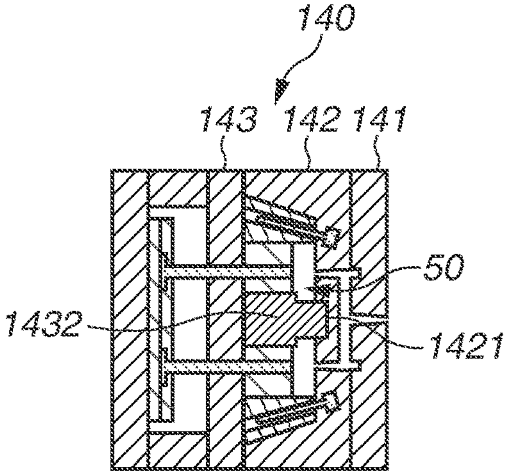

A method for manufacturing the polygon mirror 3 will now be described. FIGS. 6A to 6C and FIGS. 7A to 7C illustrate steps of the manufacturing method for the resin member 30 of the polygon mirror 3 according to the present embodiment. Molding is started in a state in which the mold 140 illustrated in FIG. 6A is open. Next, in a mold closing step illustrated in FIG. 6B, the mold 140 is closed.

In this closing step, the through-hole forming piece 1432 of the movable-side mold plate 143 is fitted into the mold hole 1421 of the stationary-side mold plate 142, aligning the stationary-side mold plate 142 and the movable-side mold plate 143 with each other, which defines the cavity 50 in the mold 140.

Figure 6C:
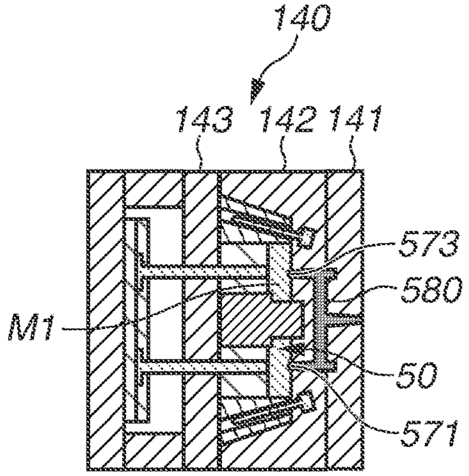

In an injection step illustrated in FIG. 6C, a molten resin M1 is injected into the cavity 50 through the runner 580 and the gates 571 to 574 in FIG. 6C by an injection molding machine not illustrated.

Figure 7A:
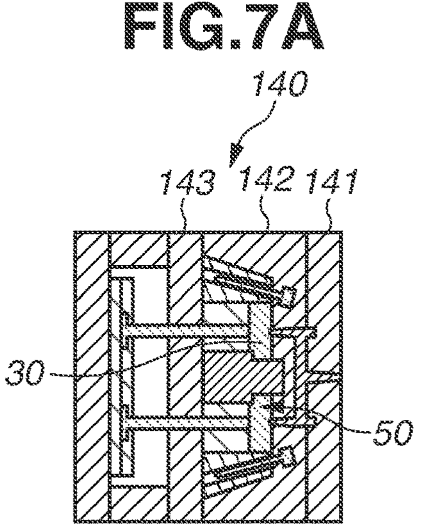
FIGS. 7A to 7C illustrate steps of a resin member manufacturing method.

In a cooling step illustrated in FIG. 7A, the mold 140 is set to a predetermined temperature lower than the temperature of the molten resin M1 to cool and solidify the molten resin M1, forming the resin member 30. The mold 140 is, for example, a water-cooled mold, which is cooled to the predetermined temperature by water.

Figure 7B:
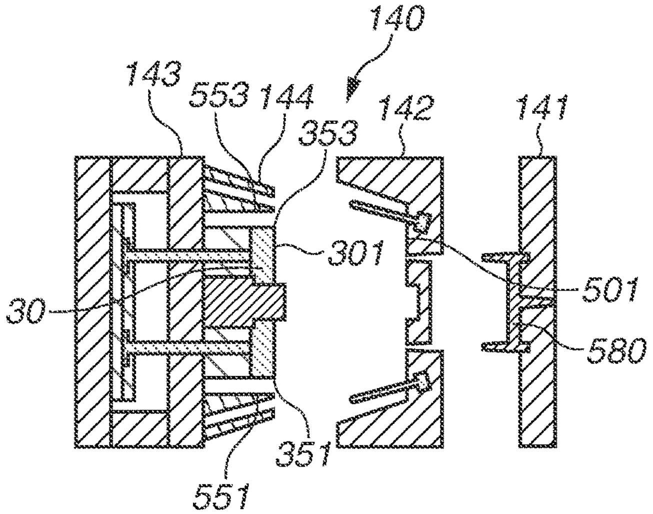

After the resin member 30 is sufficiently cooled, in a mold opening step illustrated in FIG. 7B, the mold 140 is opened. In this mold opening step, the top-surface forming surface 501 of the stationary-side mold plate 142 is separated from the top surface 301 of the resin member 30, and the side-surface forming surfaces 551 to 554, which are illustrated in FIGS. 5A and 5B, of the slide core 144 are separated from the outer side surfaces 351 to 354, which are illustrated in FIGS. 3A and 3B, of the resin member 30. Further, the runner 580 connected to the resin member 30 is separated from the resin member 30 by the runner stripper plate 141.

Figure 7C:
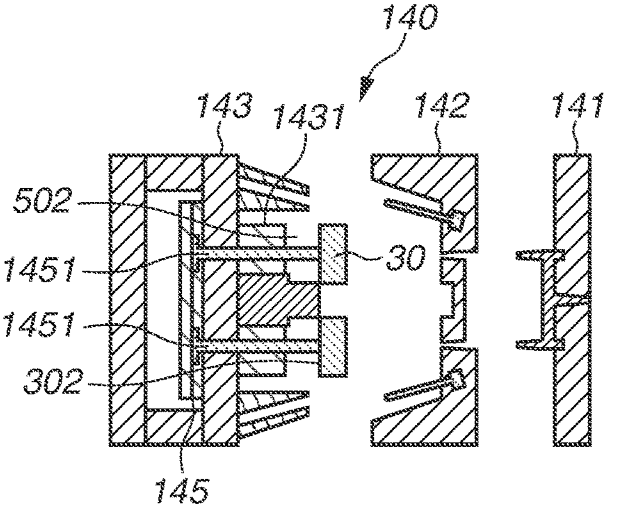

Next, in a mold removal step illustrated in FIG. 7C, the ejector plate 145 is advanced toward the movable-side core 1431 to cause the ejector pins 1451 to protrude from the movable-side core 1431, and the bottom surface 302 of the resin member 30 is separated from the bottom-surface forming surface 502 of the movable-side core 1431. In this way, the resin member 30 is removed from the mold 140.

Thereafter, in a vapor deposition step, metal such as aluminum is vapor-deposited on the outer side surfaces 351 to 354 of the resin member 30 to form reflective films serving as light reflective surfaces on the outer side surfaces 351 to 354. In this way, the polygon mirror 3 is produced.

Next, a comparative example in which the die piece division position 524 lies closer to the side-surface forming surfaces 551 to 554 than the midpoint line 400 will be described. This is also a case where the area of the recessed bottom surface 322 is larger than the area of the through-hole 16.

For example, when the midpoint line 400 forms a square with a side of 7.0 mm, the through-hole 16 has a diameter (φ) D1 of 4.0 mm, and the die piece division line 324 has a diameter (φ) D2 of 9.0 mm, the area of the region surrounded by the die piece division line 324 is 63.6 $mm^2$, and the area of the recessed bottom surface 322 is 51.0 $mm^2$. In this case, the molding pressure applied to the recessed bottom surface 322 becomes too large, deteriorating the shape accuracy of the polygon mirror 3.

In the injection step, when the molten resin M1 is injected into the cavity 50 through the runner 580 and the gates 571 to 574 illustrated in FIG. 5A, a large molding pressure is applied to the surfaces forming the cavity 50. Such a molding pressure is applied to the through-hole forming surface 522 and the recessed-bottom-surface forming surface 521 of the through-hole forming piece 1432. The molding pressure applied to the through-hole forming surface 522 cancels each other because the molding pressure is applied to the entire circumference thereof. However, the molding pressure applied to the recessed-bottom-surface forming surface 521 in the direction of the virtual line C0 causes the through-hole forming piece 1432 to be elastically deformed in the direction of the virtual line C0.

Subsequently, in the cooling step, when the molten resin M1 is cooled and solidified, the internal molding pressure is reduced due to the thermal shrinkage of the molten resin M1, and the elastic deformation of the through-hole forming piece 1432 is recovered. As a result, the cooled and solidified molten resin M1, which is the resin member 30, is pressed and internal distortion occurs.

The internal distortion of the resin member 30 is partially released in the mold opening step and the mold removal step, deteriorating the shape accuracy of the resin member 30 and the optical characteristics of the polygon mirror 3.

Being separated from the surrounding movable-side core, the through-hole forming piece 1432 is not very high in rigidity and is easily deformed by the molding pressure. Further, the deformation of the through-hole forming piece 1432 by the molding pressure worsens as the area of the recessed-bottom-surface forming surface 521 increases. That is, setting the area of the recessed-bottom-surface forming surface 521 of the through-hole forming piece 1432 to be smaller than the area of the through-hole forming surface 522 in the direction orthogonal to the virtual line C0 allows deformation of the through-hole forming piece 1432 in the injection step, improving the shape accuracy of the resin member 30. In the present embodiment, the through-hole forming piece 1432 is separated from the movable-side core. However, the through-hole forming piece 1432 may be integrally formed with the movable-side core.

To increase the shape accuracy of the outer side surfaces 351 to 354 and the bottom surface 302, which is to be in contact with the base 2, of the resin member 30, it is suitable that the side-surface forming surfaces 551 to 554 and the bottom-surface forming surface 502 are provided on the same movable-side mold plate 143. To prevent the base 2 from interfering with any part of the resin member 30 other than the bottom surface 302, it is suitable that the recessed portion 321 is provided between the bottom surface 302 and the inner side surface 330 of the resin member 30. To uniformly apply the molding pressure, it is suitable that the recessed side surface 323 have the same axis as that of the inner side surface 330.

It is suitable that the length of each of the sides of the resin member 30 is between 10 mm and 30 mm, inclusive. For example, the length is 14.1 mm and the diameter φ of the circumscribed circle is 20 mm. In addition, it is suitable that the thickness of the resin member 30 is between 0.5 mm and 10 mm, inclusive. For example, the thickness is 2 mm.

The top surface 301 has gate marks 171 to 174 corresponding to the four gates 571 to 574, respectively, which are the resin injection ports. Each of the gate marks 171 to 174 lies at the same distance from the through-hole 16. The locations of the outer side surfaces 351 to 354 correspond to the locations of the gate marks 171 to 174, respectively.

Each of the outer side surfaces 351 to 354 and each of the gate marks 171 to 174 are rotationally symmetric with respect to the virtual line C0.

Figure 8A:
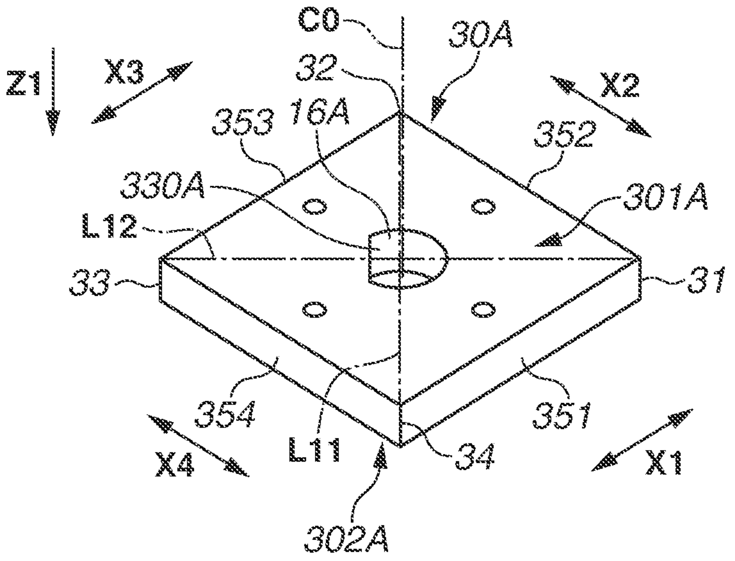
FIGS. 8A and 8B are each a perspective view of a polygon mirror according to a second embodiment.
Figure 8B:
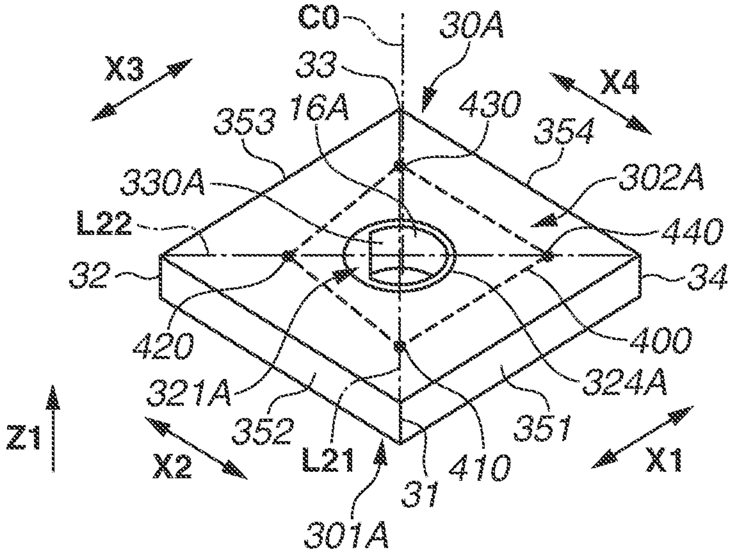

A polygon mirror 3 according to a second embodiment will be described with reference to FIGS. 8A and 8B. FIG. 8A is a perspective view of the top surface of a resin member 30A according to the present embodiment, and FIG. 8B is a perspective view of the bottom surface of the resin member 30A according to the present embodiment.

The polygon mirror 3 according to the present embodiment differs from that according to the first embodiment in that a through-hole 16A does not have a circular shape. The through-hole 16A has a shape formed by a straight line and a curved line. The through-hole 16A has a rounded shape in which the individual boundaries between the arc having different radii and the straight line are smoothly connected to each other. The rounded shape is one without a vertex. Since the through-hole 16A has a non-circular shape, a midpoint 420 between a corner portion 32 and the through-hole 16A lies closer to the through-hole 16A than other midpoints 410, 430, and 440. In the present embodiment, a die piece division line 324A also lies closer to the through-hole 16A than a midpoint line 400.

That is, the distance from the die piece division line 324A to an inner side surface 330A is shorter than the distance from the die piece division line 324A to each of the corner portions 31 to 34. Even when the through-hole 16A does not have a circular shape but has a shape in which a straight line is formed instead the part of a circle, the central axis of the through-hole 16A can be a virtual line C0.

A recessed portion 321A of a bottom surface 302A, which is the region surrounded by the die piece division line 324A, is circular. The central axis of the arc of the through-hole 16A and the central axis of the circle formed by the region surrounded by the die piece division line 324A coincides with the virtual line C0.

By forming the through-hole 16A in the non-circular shape, the through-hole 16A can be used for preventing rotation between the base 2 and the polygon mirror 3, for example. In addition, with the individual boundaries between the circular line and the straight line smoothly connected to each other, the through-hole 16A has no corner portions in the cross section taken in the direction orthogonal to the virtual line C0. This prevents breakage caused by stress concentration in producing the polygon mirror 3 or using the optical deflector.

In the present embodiment, for example, the through-hole 16A has a shape obtained by cutting the part at a plane taken along at a distance of 1 mm from the virtual line C0 from the cylindrical surface with a diameter φ of 4.0 mm and the boundaries between the cylindrical surface and the plane are rounded with a radius of 0.8 mm. The die piece division line 324A, which is the outer periphery of the recessed portion 321A, is circular and has a diameter φ of, for example, 4.8 mm. The area of the through-hole 16A is 10.1 $mm^2$, and the area of the region sandwiched between the outer periphery of the recessed portion 321A and the through-hole 16A is 8.0 $mm^2$. The area of the region sandwiched between the die piece division line 324A and the through-hole 16A is smaller than the area of the through-hole 16A.

Figure 9A:
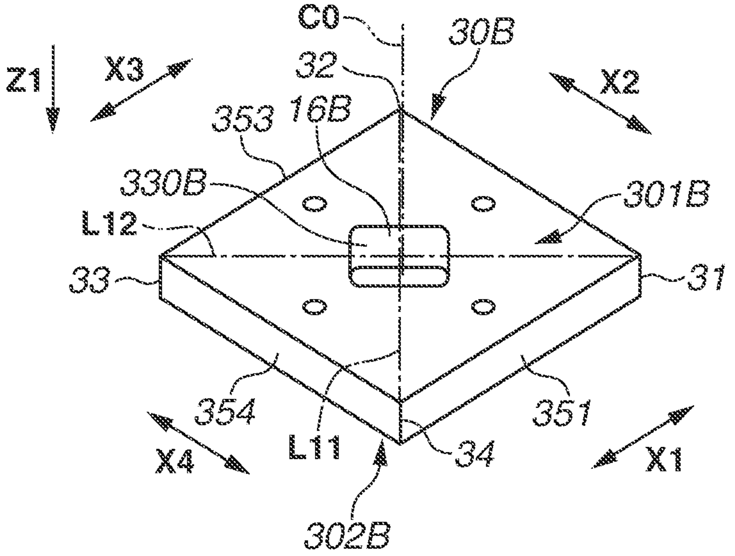
FIGS. 9A and 9B are each a perspective view of a polygon mirror according to a third embodiment.
Figure 9B:
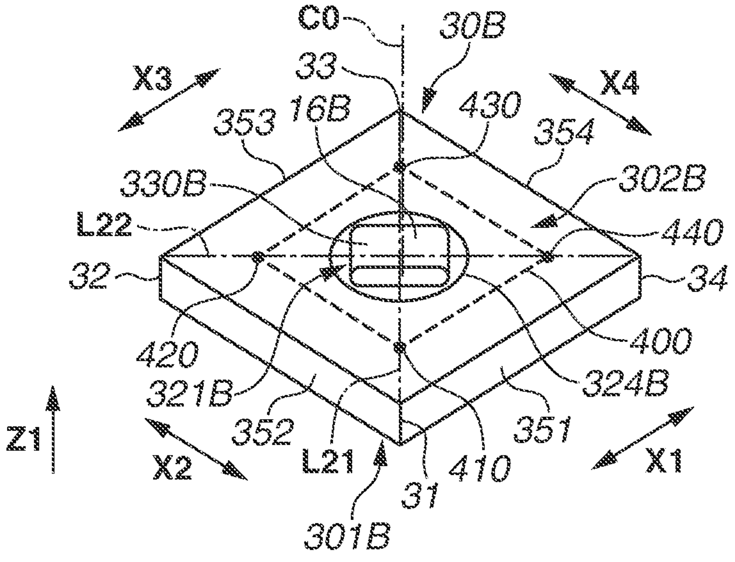

A polygon mirror 3 according to a third embodiment will be described with reference to FIGS. 9A and 9B. FIG. 9A is a perspective view of the top surface of a resin member 30B of the polygon mirror 3 according to the present embodiment, and FIG. 9B is a perspective view of the bottom surface of the resin member 30B of the polygon mirror 3 according to the present embodiment.

The polygon mirror 3 according to the present embodiment differs from that according to the first embodiment in that a through-hole 16B has a rectangular shape. The through-hole 16B has straight lines connected to each other in a rounded manner to form a quadrangular shape in which the four corners of the square are smoothly connected by arcs. A recessed portion 321B, which is a die piece division line 324B, is circular. The central axis of the through-hole 16B and the central axis of the recessed portion 321B coincides with the virtual line C0. Since the through-hole 16B has a rectangular shape, a midpoint line 400 lies closer to the through-hole 16B than the midpoint line 400 in the first embodiment. Thus, the die piece division line 324B lies also closer to the through-hole 16B, and the area of the region sandwiched between the die piece division line 324B and the through-hole 16B can be designed to be smaller.

With the through-hole 16B formed with the four straight lines, for example, the contact position between the base 2 and the through-hole 16B of the polygon mirror 3 can be limited, which facilitates adjustment of dimensions.

In the present embodiment, for example, the through-hole 16B forms a square with four sides of 4.0 mm and the corners thereof rounded with a radius of 0.8 mm. The die piece division line 324B, which is the outer periphery of the recessed portion 321B, is circular and has a diameter φ of, for example, 6.0 mm. The area of the through-hole 16B is 15.6 $mm^2$, and the area of the region sandwiched between the outer periphery of the recessed portion 321B and the through-hole 16B is 12.7 $mm^2$. The die piece division line 324B lies closer to the through-hole 16B than the midpoint line 400, and the area of the region sandwiched between the die piece division line 324B and the through-hole 16B is smaller than the area of the through-hole 16B.

In the present embodiment, the through-hole 16B has a cross section in a shape in which the four corners of the square are connected by arcs. However, the present disclosure is not limited thereto. The through-hole 16B may have a shape in which the corners of a regular pentagon or a regular hexagon are connected by arcs. To maintain the symmetry of the resin member 30, it is suitable that the number of straight lines in the cross section of the through-hole 16B is a divisor of the number of outer side surfaces 351 to 354.

Figure 10A:
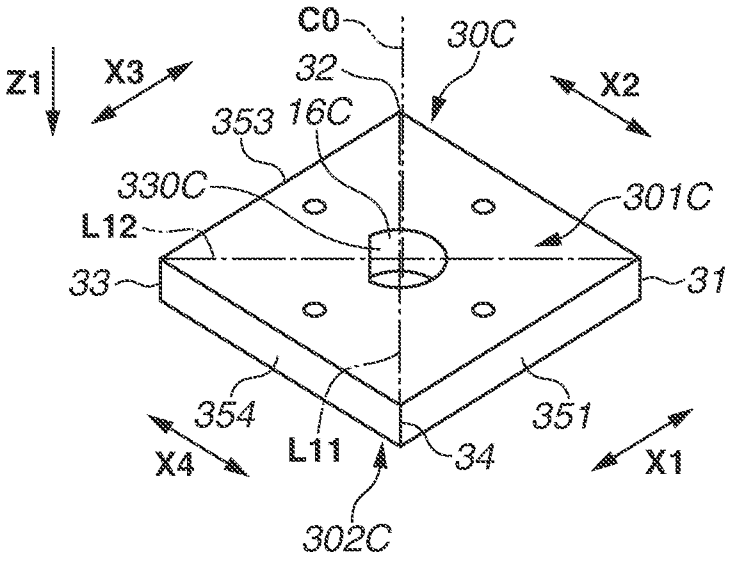
FIGS. 10A and 10B are each a perspective view of a polygon mirror according to a fourth embodiment.
Figure 10B:
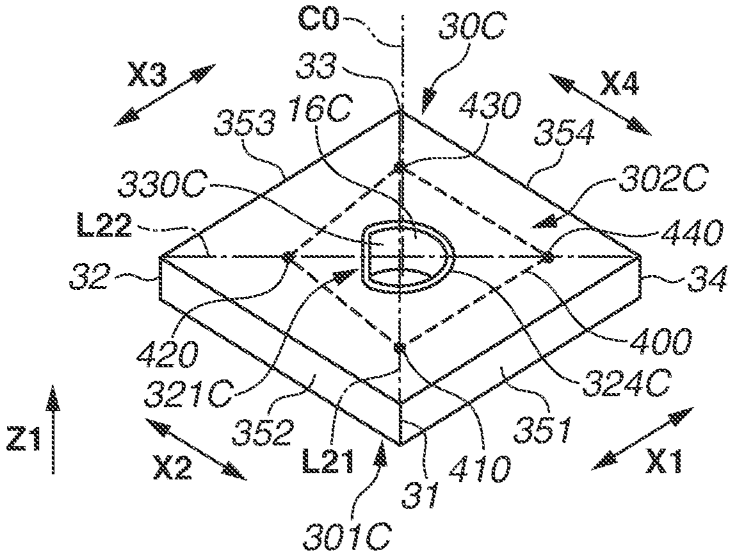

Next, a polygon mirror 3 according to a fourth embodiment will be described with reference to FIGS. 10A and 10B. FIG. 10A is a perspective view of the top surface of a resin member 30C of the polygon mirror 3 according to the present embodiment, and FIG. 10B is a perspective view of the bottom surface of the resin member 30C of the polygon mirror 3 according to the present embodiment.

The polygon mirror 3 according to the present embodiment differs from that according to the second embodiment in that a die piece division line 324C has a round shape similar to that of a through-hole 16C.

The through-hole 16C is formed in a shape obtained by cutting a part of the circle along a straight line. This limits the contact position between a base 2 and the through-hole 16C of the polygon mirror 3, which facilitates adjustment of the dimensions. In addition, the die piece division line 324C is formed so as to match the shape of the through-hole 16C. This can reduce the area of the region sandwiched between the outer periphery of a recessed portion 321C and the through-hole 16C. This further reduces deformation of a through-hole forming piece 1432 in the injection step, further improving the shape accuracy of the resin member 30C. In the present embodiment, the die piece division line 324C also lies closer to the through-hole 16C than a midpoint line 400.

It is suitable that the angle formed by the straight line of the through-hole 16C and the straight line of the die piece division line 324C facing the straight line of the through-hole 16C is less than 15°. By forming the through-hole 16C and the die piece division line 324C in a similar shape, the area of the region sandwiched between the outer periphery of the recessed portion 321C and the through-hole 16C can be reduced, which improves the shape accuracy of the resin member 30C. It is more suitable that the angle formed by the straight line of the cross section of the through-hole 16C and the straight line of the cross section of the recessed portion 321C is less than 1°.

It is suitable that the distance from the straight line of the cross section of the through-hole 16C to the straight line of the cross section of the recessed portion 321C is between 0.5 times and 2 times, inclusive, the distance from one arc of the cross section of the through-hole 16C to the corresponding arc of the cross section of the recessed portion 321C. This reduces asymmetric deformation of a through-hole forming piece, improving the shape accuracy of the resin member 30C.

Figure 11A:
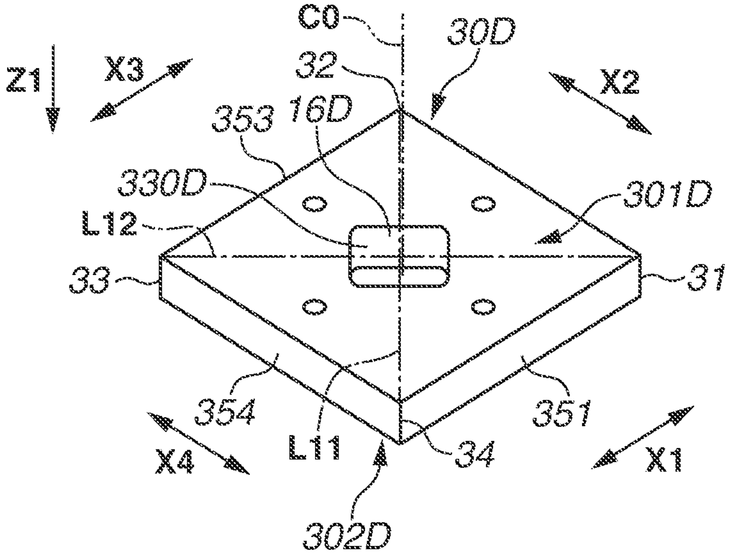
FIGS. 11A and 11B are each a perspective view of a polygon mirror according to a fifth embodiment.
Figure 11B:
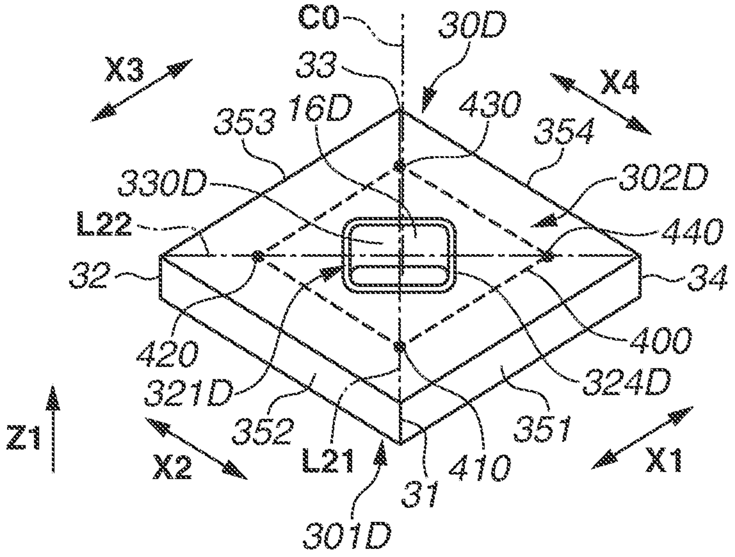

Next, a polygon mirror 3 according to a fifth embodiment will be described with reference to FIGS. 11A and 11B. FIG. 11A is a perspective view of the top surface of a resin member 30D of the polygon mirror 3 according to the present embodiment, and FIG. 11B is a perspective view of the bottom surface of the resin member 30D of the polygon mirror 3 according to the present embodiment.

The polygon mirror 3 according to the present embodiment differs from that according to the third embodiment in that a die piece division line 324D has a rectangular shape similar to that of the through-hole 16D. By forming the die piece division line 324D and the through-hole 16D in a similar shape, the area of a recessed portion 321D can be set to be even smaller. This can further reduce deformation of a through-hole forming piece 1432 in the injection step as in the fifth embodiment, further improving the shape accuracy of the resin member 30. In the present embodiment, the die piece division line 324D also lies closer to the through-hole 16D than a midpoint line 400.

Figure 12A:
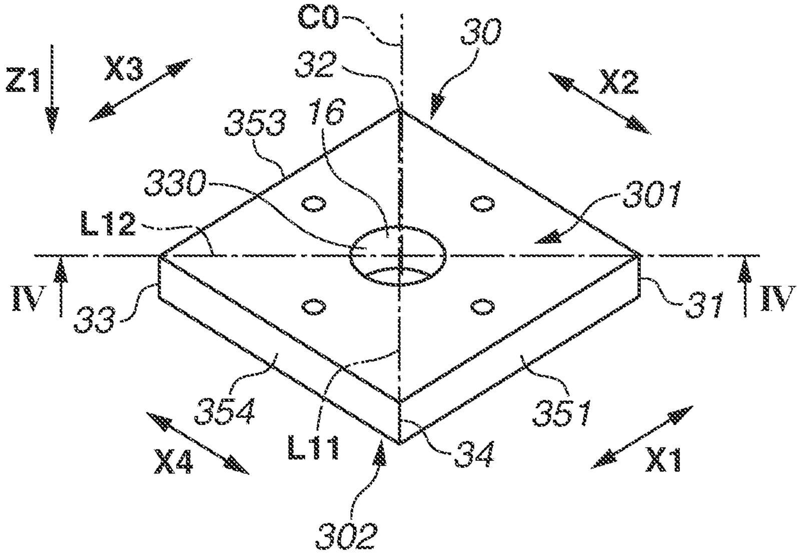
FIGS. 12A and 12B are each a perspective view of a polygon mirror according to a sixth embodiment.
Figure 12B:
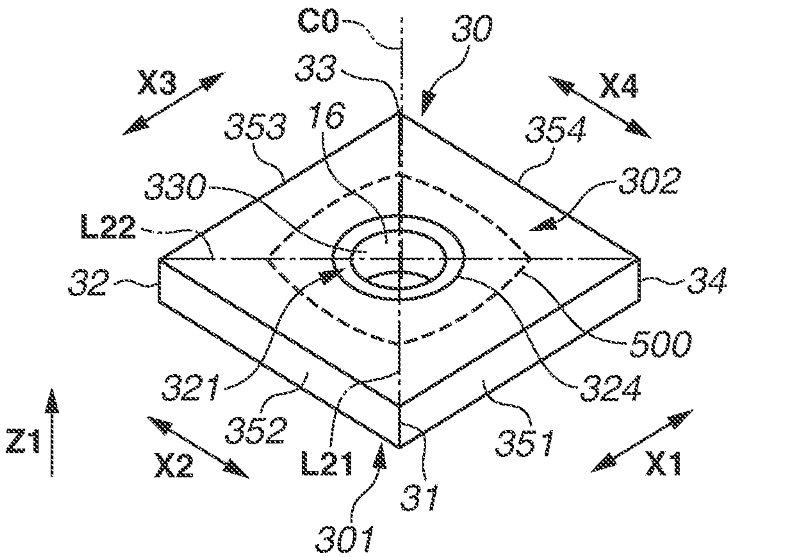

Next, a polygon mirror 3 according to a sixth embodiment will be described with reference to FIGS. 12A and 12B. FIG. 12A is a perspective view of the top surface of a resin member 30 of the polygon mirror 3 according to the present embodiment, and FIG. 12B is a perspective view of the bottom surface of the resin member 30 of the polygon mirror 3 according to the present embodiment.

In the present embodiment, midpoints are defined between an inner side surface 330 and outer side surfaces 351 to 354 on line segments radially connecting the center of a through-hole 16 and the outer side surfaces 351 to 354. A die piece division line 324 lies closer to the through-hole 16 than a midpoint line 500 formed by connecting each midpoint and the midpoints adjacent to each midpoint. This configuration allows the die piece division line 324 near the center of each of the outer side surfaces 351 to 354 to lie closer to the outer side surfaces 351 to 354 than in the polygon mirror 3 according to the second embodiment. On line segments radially connecting the center of the through-hole 16 and the outer side surfaces 351 to 354, when a midpoint between the inner side surface 330 and a certain portion of any one of the outer side surfaces 351 to 354 is a second midpoint, a midpoint adjacent to the second midpoint is a third midpoint.

This allows the through-hole 16 to have a range in size, which allows the through-hole 16 to have a degree of flexibility in shape.

Figure 13A:
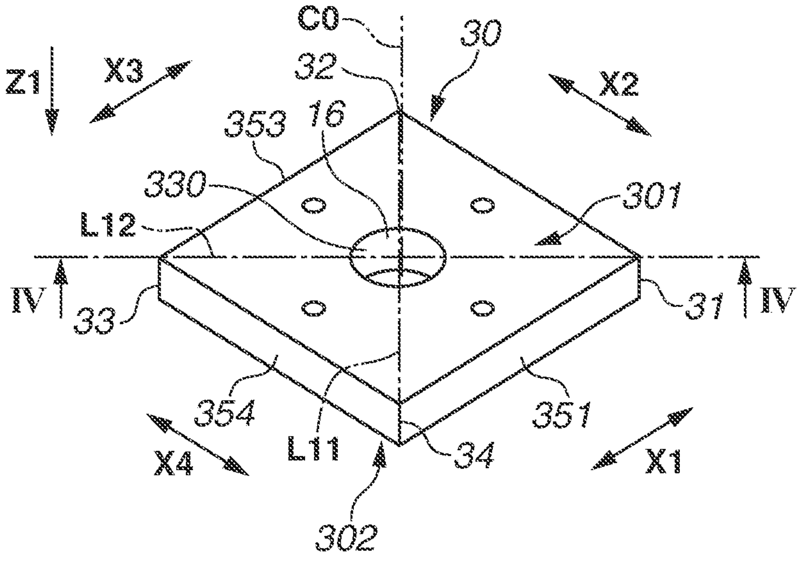
FIGS. 13A and 13B are each a perspective view of a polygon mirror according to a seventh embodiment.
Figure 13B:
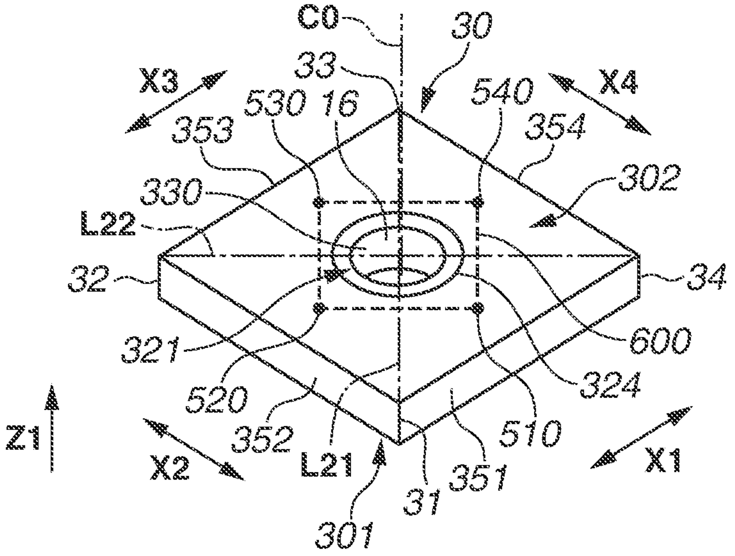

Next, a polygon mirror 3 according to a seventh embodiment will be described with reference to FIGS. 13A and 13B. FIG. 13A is a perspective view of the top surface of a resin member 30 of the polygon mirror 3 according to the present embodiment, and FIG. 13B is a perspective view of the bottom surface of the resin member 30 of the polygon mirror 3 according to the present embodiment.

In the polygon mirror 3 according to the present embodiment, a die piece division line 324 lies closer to a through-hole 16 than a midpoint line 600 connecting midpoints 510, 520, 530, and 540 between an inner side surface 330 and a plurality of outer side surfaces 351 to 354, respectively. With this configuration, the die piece division line 324 is formed even closer to the through-hole 16 than in the second embodiment. This reduces the area of a recessed portion 321, further improving the shape accuracy of the resin member 30. The outer side surface 351 is, for example, a first outer side surface, and the outer side surfaces 352 and 354 adjacent to the outer side surface 351 are each a second outer side surface. The midpoint 510 is, for example, a fifth midpoint, and the midpoints 520 and 540 are each a sixth midpoint.

In the embodiments described above, the midpoint lines 400, 500, and 600 are virtual lines, and there are no such actual line segments in the resin member 30.

Figure 14A:
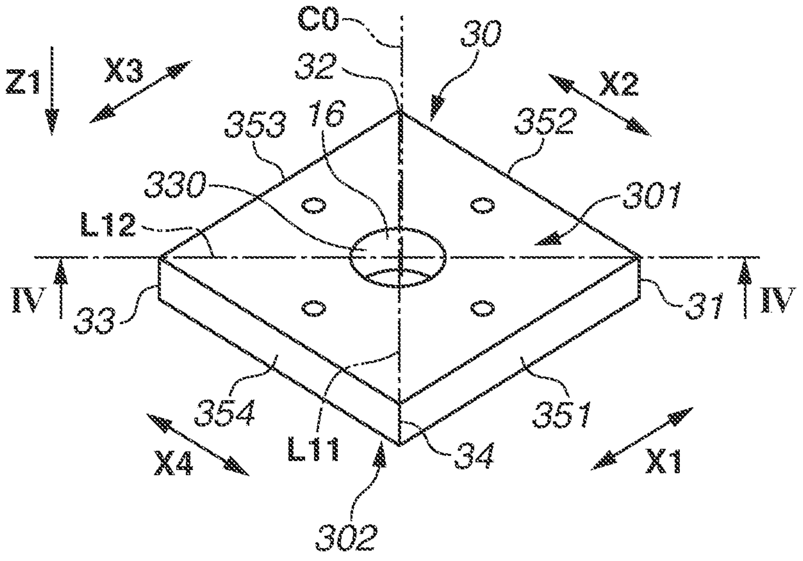
FIGS. 14A and 14B are each a perspective view of a polygon mirror according to an eighth embodiment.
Figure 14B:
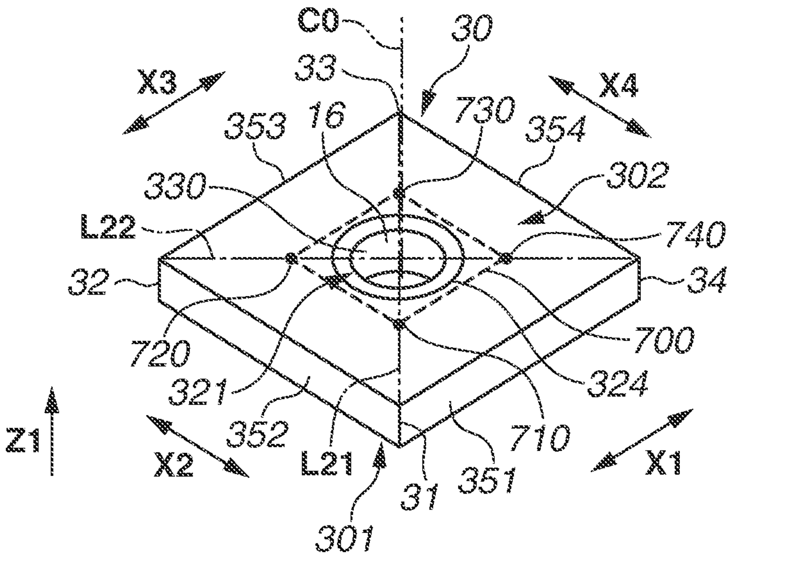

Next, a polygon mirror 3 according to an eighth embodiment will be described with reference to FIGS. 14A and 14B. FIG. 14A is a perspective view of the top surface of a resin member 30 of the polygon mirror 3 according to the present embodiment, and FIG. 14B is a perspective view of the bottom surface of the resin member 30 of the polygon mirror 3 according to the present embodiment.

The polygon mirror 3 according to the present embodiment differs from that according to the first embodiment in that a die piece division line 324 lies closer to a through-hole 16 than a first point 710 that lies on a diagonal line L21 and that is away from a virtual line C0 by ¼ of the length of the diagonal line L21.

This configuration allows the design of the area between the die piece division line 324 and the through-hole 16 smaller than that in the first embodiment.

It is more suitable that the die piece division line 324 lies closer to the through-hole 16 than a line segment 700 connecting the first point 710 and a second point 720 or 740 lying on a diagonal line L22 adjacent to the diagonal line L21. The second points 720 and 740 are away from the virtual line C0 by ¼ of the length of a diagonal line L22.

The present disclosure is not limited to the embodiments described above, and many modifications can be made within the technical idea of the present disclosure. In addition, the effects described in the embodiments are merely the most advantageous effects achieved by the present disclosure, and the advantageous effects according to the present disclosure are not limited to those described in the embodiments.

In the above embodiments, the resin member 30 of the polygon mirror 3 forms a quadrangular prism with four outer side surfaces. However, the present disclosure is not limited thereto. It is suitable that the resin member forms a prism with four or more outer side surfaces. In particular, it is suitable that the resin member forms a quadrangular prism, a pentagonal prism, or a hexagonal prism.

In the above embodiments, the top surface 301 and the bottom surface 302 of the resin member 30 each have a square as the outer shape, that is, all the sides have the same length. However, the present disclosure is not limited thereto. As long as the top surface 301 and the bottom surface 302 have a polygonal shape, each side may have a different length from one another. However, in the image forming apparatus 100, it is suitable that the top surface 301 and the bottom surface 302 have a regular polygonal shape.

The embodiments described above can be appropriately modified without departing from the technical idea. For example, a plurality of embodiments may be combined. In addition, part of the matters of at least one embodiment can be deleted or replaced.

In addition, a new matter may be added to at least one embodiment. The disclosure of the present description includes all matters that can be grasped from the present description and the drawings attached to the present description, as well as matters explicitly described in the present description.

The disclosure of the present description also includes a complementary set of individual concepts described herein. That is, for example, if there is a description stating that "A is greater than B" in the present description, it can be said that the present description discloses that "A is not greater than B" even if the description stating that "A is not greater than B" is omitted. This is because when "A is greater than B" is described, it is assumed that the case where "A is not greater than B" is considered.

A technique advantageous in improving the shape accuracy of a molded product is provided.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-032615, filed Mar. 3, 2022, which is hereby incorporated by reference herein in its entirety.

What is claimed is:

1. A polygon mirror comprising a resin member, the resin member including:

a first surface;

a second surface opposite to the first surface;

a through-hole extending from the first surface to the second surface;

an inner side surface, which intersects with the first surface and the second surface, surrounding the through-hole;

a plurality of outer side surfaces, each of which intersects with the first surface and the second surface on an opposite side of the inner side surface; and a die piece division line surrounding the through-hole and disposed on the second surface, wherein the die piece division line is closer to the outer side surfaces than the through-hole, wherein the second surface intersects with the individual outer side surfaces at intersection lines, wherein the intersection lines include a first intersection line and a second intersection line that intersects with the first intersection line at an intersection, which is a first corner portion, and wherein the die piece division line is provided closer to the through-hole than a first midpoint between the inner side surface and the first corner portion.

2. The polygon mirror according to claim 1, wherein the die piece division line is provided closer to the through-hole than a line segment connecting a second midpoint and a third midpoint adjacent to the second midpoint among midpoints lying between the inner side surface and the outer side surfaces on line segments radially connecting a center of the through-hole and the outer side surfaces.

3. The polygon mirror according to claim 1, wherein the die piece division line is provided closer to the through-hole than a line segment connecting a fourth midpoint and the first midpoint, the fourth midpoint lying between the inner side surface and a second corner portion sharing a corresponding outer side surface of the outer side surfaces with the first corner portion.

4. The polygon mirror according to claim 1, wherein an area of a region between the die piece division line and the through-hole is smaller than two-thirds of an area of a region surrounded by the die piece division line.

5. The polygon mirror according to claim 1, wherein the die piece division line is provided at a position of 0.2 mm or more away from the through-hole.

6. The polygon mirror according to claim 1, wherein the die piece division line is provided closer to the through-hole than a line segment connecting a fifth midpoint between the inner side surface and a first outer side surface among the outer side surfaces and a sixth midpoint between the inner side surface and a second outer side surface adjacent to the first outer side surface.

7. The polygon mirror according to claim 1, wherein the die piece division line has a non-circular shape.

8. The polygon mirror according to claim 1, wherein the die piece division line includes a plurality of straight lines and a curved line.

9. The polygon mirror according to claim 8, wherein the die piece division line has a rounded portion at which the straight lines of the die piece division line are connected to each other and has a rounded portion at which each of the straight lines and a curved line is connected to each other.

10. The polygon mirror according to claim 1, wherein the through-hole has a non-circular shape.

11. The polygon mirror according to claim 1, wherein the through-hole on the first surface is identical in shape to the through-hole on the second surface.

12. The polygon mirror according to claim 1, wherein, a shape of the through-hole on the first surface and a shape of the through-hole on the second surface are formed by a straight line and a curved line.

13. The polygon mirror according to claim 1, wherein, on the second surface, the through-hole and the die piece division line each have a shape including at least one straight line, and wherein the at least one straight line included in the through-hole and the at least one straight line included in the die piece division line form an angle of less than 15 degrees.

14. The polygon mirror according to claim 13, wherein a number of straight lines included in a shape of the through-hole equals a number of straight lines included in a shape of the die piece division line.

15. The polygon mirror according to claim 1, wherein a region from the die piece division line to the through-hole on the second surface is recessed toward the first surface with respect to a region from the die piece division line to the outer side surfaces.

16. The polygon mirror according to claim 1, wherein an intersection line between the second surface and the outer side surfaces is used as a reference of a height in a direction from the second surface to the first surface, and wherein a region from the die piece division line to the through-hole on the second surface is recessed toward the first surface with respect to the reference.

17. The polygon mirror according to claim 1, wherein an area of a region between the die piece division line and the through-hole is smaller than an area of the through-hole on a plane including the second surface.

18. An optical deflector comprising:

the polygon mirror according to claim 1; and a drive source configured to rotate the polygon mirror.

19. An optical scanning device comprising:

a light source; and the optical deflector according to claim 18 configured to deflect light emitted from the light source.

20. An image forming apparatus comprising an image forming unit configured to form an image on a sheet, wherein the image forming unit includes an image carrier and the optical scanning device according to claim 19 configured to scan a surface of the image carrier with light.

* * * * *